Oct. 25, 1932.  O. SCHRIEVER  1,884,285
PHOTO ELECTRIC TUBE
Filed Sept. 3, 1926
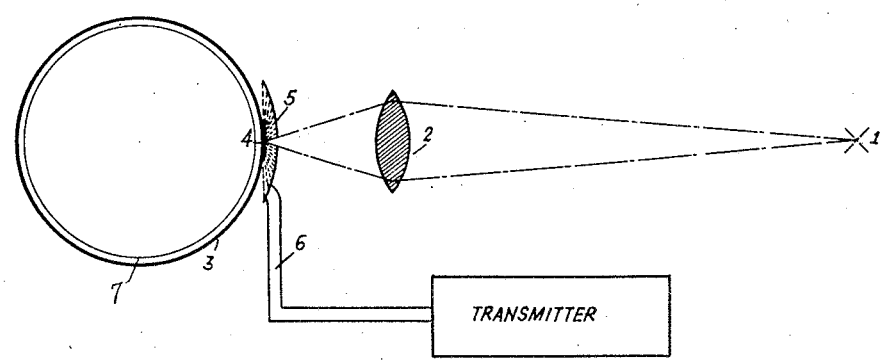
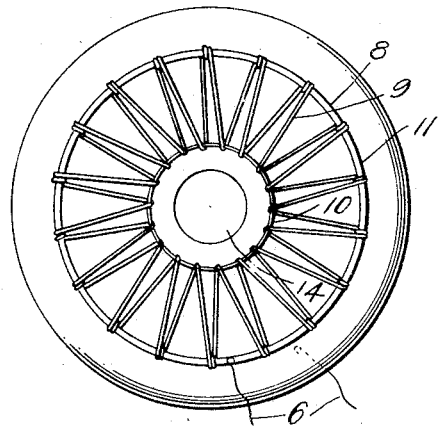 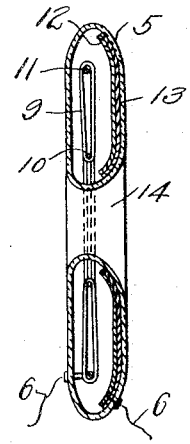
INVENTOR
OTTO SCHRIEVER
BY *Ira J. Adams*
ATTORNEY Patented Oct. 25, 1932

1,884,285

UNITED STATES PATENT OFFICE

OTTO SCHRIEVER, OF BERLIN, GERMANY, ASSIGNOR TO TELEFUNKEN GESELLSCHAFT FUR DRAHTLOSE TELEGRAPHIE M. B. H. HALLESCHES, OF BERLIN, GERMANY, A CORPORATION OF GERMANY

PHOTO-ELECTRIC TUBE

Application filed September 3, 1926, Serial No. 133,390, and in Germany October 7, 1925.

In the art of picture telegraphy, it is the usual practice to effect a decomposition or exploration of the picture by sending a luminous ray across the picture or the different more or less transparent points thereof, upon a photo-electric cell. So far as the suitability of the picture for transmission is concerned, the requirement that the picture should be transparent means a serious limitation.

The present invention obviates this inconvenience by disclosing means by which it is convenient to transmit also non-transparent pictures, for instance, a printed newspaper sheet. This is made possible because the light ray passed through the cell and over the picture surface for exploration or scanning purposes suffers a more or less intensive diffuse reflection in the neighborhood of the reflection point surrounded by the photo-electric cell in such a manner that the diffusely reflected light reaches as completely as possible the active surface of the cell.

The invention is diagrammatically illustrated in the accompanying drawing, wherein:

Fig. 1 diagrammatically shows an arrangement by which a photo cell of the type herein disclosed may be used in combination with a picture transmitting drum;

Fig. 2 shows a front view of the cell looking toward the left from the position shown in Fig. 1 and toward the light sensitive element; and, Fig. 3 shows a sectional view of the cell illustrating the arrangement of the light sensitive coating and the electrodes.

The light issuing, for instance, from the punctiform light-source 1 is concentrated by means of lens 2 upon point 4 of a picture 3 wrapped upon a drum 7. The light ray reaching the picture is thus more or less diffusely reflected according to whether a light or a dark point of the picture is being explored. According to the invention, the photo-electric cell 5 is disposed as closely as possible to the reflection point 4, or, more precisely speaking, so that from the rear of the cell the original light ray is passed directly through the cell and against the picture surface. The face or front portion of the cell which is sensitive to the reflected or diffused light from the picture then converts this light into electrical energy. The shape of the photoelectric cell is preferably chosen annular and with small inside and large outside diameter. For the purpose of screening the cell from light other than that which is reflected from the picture surface, the outer surface of the cell 5, which is arranged to face toward the lens 2, as shown by Fig. 1, is coated with any appropriate light opaque substance, so as to render its face impermeable to light. The area of the cell is conveniently shaped to the curvature of the picture carrying surface or drum 7, so that the reflected or diffused light will, of necessity, have to reach the cell, whereby the cell efficiency is increased.

The wires 6 connect the photo-electric cell 5 to a suitable transmitting apparatus of any desired character. At times it may be advisable to screen the photo-cell 5 on the side toward the lens 2, for in some cases although the cell is shielded from light opaque substance between the light source and the potassium or other coating on the inside of the cell, there is often sufficient light penetration to cause the cell to act when it should not and tend toward inaccurate transmission especially with a high intensity light source.

By Figs. 2 and 3, the cell per se is more particularly shown, and referring thereto, the wires 6 connect respectively to the anode member 8 which is formed from a wire 9 wound in and out between two ring-like conducting members 10 and 11, and to the photoelectric layer 12 on the inside portion of the cell. The face 5 which is to be placed toward the light source has coated thereon a light opaque substance generally designated 13, coated on the cell wall between the light sensitive substance 12 and the outer face 5. The annular opening 14 is shown as being larger on the side toward the light than on the side toward the picture surface.

The invention is applicable to any desired form or nature of photo-electric cells, for instance, both to selenium cells as well as to vacuum photo-electric cells of all types, it being immaterial in this connection whether in the latter case the entire glass body is shaped annular, or only the layer sensitive to photo-electric action.

The advantage of the idea underlying this invention resides above all in that in the use of a photo cell of the character above described the prerequisite of transparency of the original image to be transmitted need not be fulfilled and at the same time the cell may be placed adjacent the picture carrying surface so that the angle of incidence between the light ray and the picture surface may be zero degrees. The cell may also be so arranged as to absorb practically the total amount of reflected light. This is in contrast to arrangements where the light strikes the picture surface in such a direction that the angle of incidence is other than zero degrees and, as a result of which, a certain part of the light may not reach the cells. This arrangement offers distinct advantages to the application of picture telegraphy in practice since the light is arranged to strike the picture in a line which corresponds to a normal to the picture surface, which leads to greater efficiency of transmission.

Having described my invention, I claim:

1. An annular photoelectric tube comprising a light opaque outer surface, a light sensitive inner surface, and an anode member, said annular shaping of said tube providing an opening through the center of said tube through which light rays from an external source may be passed, said opening having a relatively large diameter at the outer face of said tube and a relatively small diameter at the inner face of said tube whereby the light passing through the said tube from the said external source is concentrated at the inner surface of said tube.

2. A toroidal shaped photo tube having a coating on one face thereof for rendering said face opaque to light, a light sensitive coating on said face for responding to light changes produced by diffused light, and an anode, said tube having a central opening for passing light rays reaching said face which is opaque to light through said tube, whereby light passing through said tube may be diffusely reflected to influence said light sensitive coating.

3. A toroidal shaped photo tube having its contour curved at a predetermined radius of curvature for conforming to the shape of a picture surface with which it is to be associated, a light opaque substance coating the surface of said tube which is removed from the picture surface, an anode member, and a light sensitive coating on said face of said tube toward said picture surface for causing response from said tube due to light striking the same.

4. A toroidal shaped photo tube comprising a light sensitive portion on one face, a coating on the other face thereof for rendering said last named face opaque to light, and a central portion provided by said toroidal shaping for passing light rays reaching said light opaque face, said central portion being of conical shape and having the conical sides coated with said substance for rendering the same opaque to light, and the larger cross-sectional area of said conical section being toward the face of said tube provided with said light opaque coating.

5. An annular photoelectric tube comprising an annular envelope, a light opaque substance coating one surface of said tube envelope, an anode member within the tube, and a light sensitive coating on one face of the tube.

OTTO SCHRIEVER.